United States Patent
Zhu et al.

(10) Patent No.: US 10,218,765 B1
(45) Date of Patent: Feb. 26, 2019

(54) CONTENT-INDEPENDENT EVALUATION OF STREAMING MEDIA BASED ON PACKET TRANSMISSION PERFORMANCE

(71) Applicant: Cisco Technology, Inc., San Jose, CA (US)

(72) Inventors: Xiaoqing Zhu, Austin, TX (US); Dan Tan, Sunnyvale, CA (US); John George Apostolopoulos, Palo Alto, CA (US); Ahmed Atef Younes Badr, Toronto (CA); Ashish Khisti, Toronto (CA)

(73) Assignee: Cisco Technology, Inc., San Jose, CA (US)

( * ) Notice: Subject to any disclaimer, the term of this patent is extended or adjusted under 35 U.S.C. 154(b) by 109 days.

(21) Appl. No.: 15/271,320

(22) Filed: Sep. 21, 2016

(51) Int. Cl.
*H04L 12/24* (2006.01)
*H04L 29/06* (2006.01)
*H04L 12/26* (2006.01)
*H04L 12/807* (2013.01)

(52) U.S. Cl.
CPC .......... *H04L 65/80* (2013.01); *H04L 43/0829* (2013.01); *H04L 43/0852* (2013.01); *H04L 43/0894* (2013.01); *H04L 47/27* (2013.01); *H04L 41/00* (2013.01)

(58) Field of Classification Search
None
See application file for complete search history.

(56) References Cited

U.S. PATENT DOCUMENTS

| | | | |
|---|---|---|---|
| 8,737,219 B2 * | 5/2014 | Apostolopoulos | H04L 29/06 370/230 |
| 2008/0049787 A1 * | 2/2008 | McNaughton | H04L 12/66 370/468 |
| 2015/0171968 A1 * | 6/2015 | Featherston | H04B 10/1123 398/118 |
| 2016/0036528 A1 * | 2/2016 | Zhao | H04B 10/58 398/141 |
| 2016/0055858 A1 * | 2/2016 | Tang | G10L 19/16 704/262 |

* cited by examiner

*Primary Examiner* — Viet D Vu
*Assistant Examiner* — James A Edwards
(74) *Attorney, Agent, or Firm* — Parker Ibrahim & Berg LLP; James M. Behmke; Stephen D. LeBarron

(57) ABSTRACT

In one embodiment, a device in a network assigns packets from a communication transmitted via the network to time windows over a period of time. The device determines a transmission performance metric for each of the packets in a particular time window and calculates, for each of the time windows, local disturbance scores, which are based on the transmission performance metrics for the packet in the time windows. A particular local disturbance score for a particular time window maps the transmission performance metrics for the packets in the time window to a perceived quality metric. The device determines a distortion score for the communication by aggregating the local disturbance scores for the time windows over the period of time.

18 Claims, 9 Drawing Sheets

CONTENT-INDEPENDENT EVALUATION OF STREAMING MEDIA BASED ON PACKET TRANSMISSION PERFORMANCE

TECHNICAL FIELD

The present disclosure relates generally to computer networks, and, more particularly, to streaming media transmissions over computer networks.

BACKGROUND

Interactive multimedia applications (e.g., video conferencing, online mobile gaming, real-time video monitoring, etc.) are often transmitted over a variety of different networks. Some networks may be prone to transmission errors, and the resulting degradation of the streaming media can impinge the user experience. It is important to characterize and quantify the impact of the degradation of streaming media on application performance. A quality scoring system can then be used to assess the overall quality/health of the entire system.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
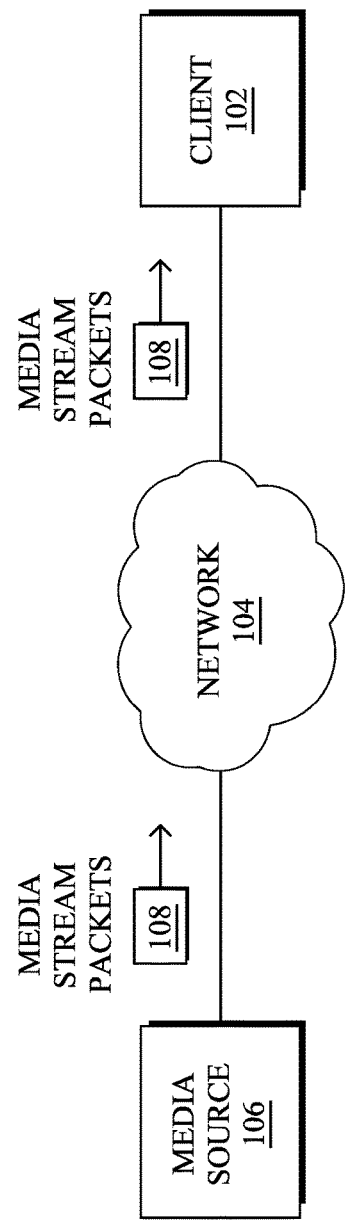
FIG. 1 illustrates an example communication network.

In the figures, reference numbers refer to the same or equivalent parts of the present invention throughout the several figures of the drawing.

DESCRIPTION OF EXAMPLE EMBODIMENTS

Overview

According to one or more embodiments of the disclosure, a device in a network assigns packets from a communication transmitted via the network to time windows over a period of time. The device determines a transmission performance metric for each of the packets in a particular time window and calculates, for each of the time windows, local disturbance scores, which are based on the transmission performance metrics for the packet in the time windows. A particular local disturbance score for a particular time window maps the transmission performance metrics for the packets in the time window to a perceived quality metric. The device determines a distortion score for the communication by aggregating the local disturbance scores for the time windows over the period of time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 illustrates an example computer system 100, according to various embodiments of the present disclosure. As shown, a client device 102 may be in communication with a media source device 106 via one or more computer networks 104. Media source device 106 provides media stream packets 108 through network(s) 104 to client device 102. As will be appreciated, network(s) 104 may include, but are not limited to, local area networks (LANs), wide area networks (WANs), the Internet, cellular networks, infrared networks, satellite networks, or any other form of data network configured to convey data between computing devices. Further, while the techniques herein are described primarily with respect to the case of streaming media, the techniques are not limited as such and can be applied to any number of different types of network communications, to evaluate the perceived quality.

Network(s) 104 may include any number of wired or wireless links between client is device 102 and media source device 106. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, WiFi links, satellite links, cellular links, infrared links, combinations thereof, or the like.

Client device 102 may be of any form of electronic device operable to communicate via network(s) 104. For example, client device 102 may be a desktop computer, a laptop computer, a tablet device, a smartphone, a wearable electronic device (e.g., a smart watch, a head up display, etc.), a smart television, a set-top device for a television, etc.

In general, client device 102 may be operable to receive media stream packets 108 and render the received content data on an electronic display. For example, client device 102 may execute a media streaming application that, when executed by client device 102, is configured to request streamed media, such as streaming video, audio, or both. In various embodiments, the media streaming application may be a stand-alone application or, alternatively, may be another form of application that is operable to render and display streaming media (e.g., a mobile application, etc.).

As shown in FIG. 1, client device 102 may send a media streaming request to media source device 106 through network(s) 104. In response to receiving the request, media source device 106 may send media streaming packets 108 to client device 102 through network(s) 104. The client device may repeat the above process any number of times with the same or different media source devices, depending on the contents of streaming media.

Figure 2:
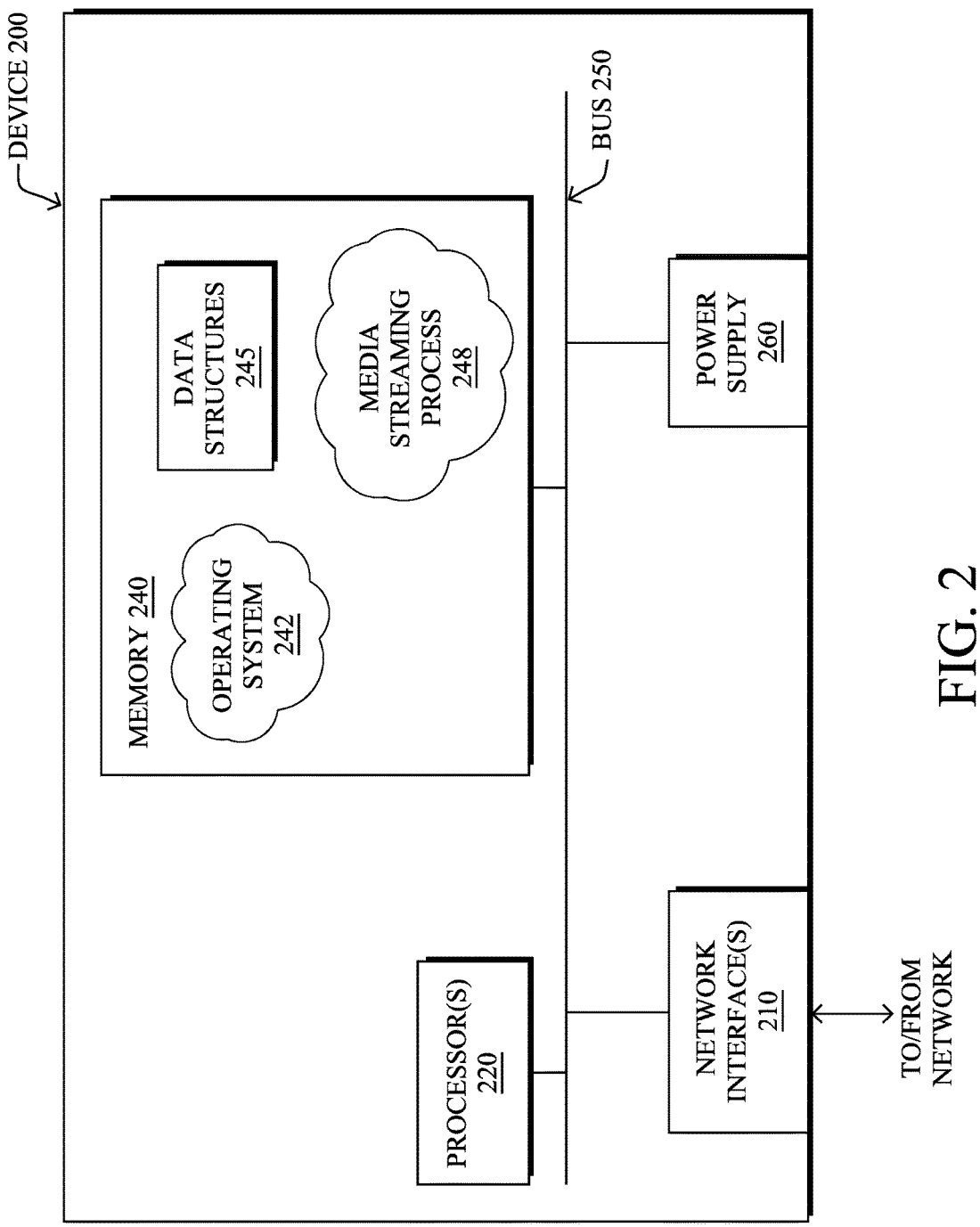
FIG. 2 illustrates an example network device/node.

FIG. 2 is a schematic block diagram of an example node/device 200 that may be used with one or more embodiments described herein, e.g., as any of the nodes shown in FIG. 1 above. In particular, device 200 may be client device 102 or media source device 106. The device may comprise one or more network interfaces 210 (e.g., wired, wireless, etc.), at least one processor 220, and a memory 240 interconnected by a system bus 250, is as well as a power supply 260 (e.g., battery, plug-in, etc.).

The network interface(s) 210 contain the mechanical, electrical, and signaling circuitry for communicating data to network 104. The network interfaces may be configured to transmit and/or receive data using a variety of different communication protocols. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which is typically resident in memory 240 and executed by the processor, functionally organizes the device by, inter alia, invoking operations in support of software processes and/or services executing on the device. These software processes and/or services may include media streaming process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, media (e.g., audio, video, video conferencing, online mobile gaming, real-time video monitoring, etc.) is often streamed via networks that experience transmission errors, thereby impacting the user experience. For example, packet losses is due to weak signal strength in a cellular network may lead a cell phone user to believe that the quality of any streamed media to be poor. Quantifying the effects of the network (e.g., in terms of losses, delays, jitter, etc.) on the media stream can be used to adjust the operation of the network, improve system design, and for other purposes.

In some embodiments, the performance of the media stream can be assessed from the perspective of the user using a class of techniques referred to as perceptual quality techniques. Generally, these techniques focus on the audio, video etc., that is presented to the end user after transmission. It is common to express perceptual quality in Mean Opinion Scores (MOS) which quantifies user experience on a score from 1-5 (e.g., from bad to excellent). For example, Perceptual Evaluation of Speech Quality (PESQ) scores refer to a method to compute MOS by comparing the original audio to that actually experienced by the user.

While quality metrics based on signal comparisons are of some use, they are also content dependent. For example, a bad loss pattern (e.g., a long burst of losses) may remain completely unnoticeable to an end user if it occurs during a period of speech silence. In many applications, such as rating the quality of the last call, this is precisely what one wants. In other applications, such as evaluating whether the current wireless network condition is suitable for voice call, the variation due to content is irrelevant and is a distraction that needs to be "averaged out". To arrive at a non-content specific measure of expected distortion for a loss pattern based on media-specific computations would require averaging over multiple simulations, with different shifts of the loss and for different media content, which would clearly be impractical.

An alternative way to measure the degradation of streaming media or other network communications may be to assess the performance of the network itself. For example, simple network metrics such as average packet loss ratio, delays, jitter, etc., can be used to assess the extent of degradation during transit. However, these metrics fail to capture the effect of transmission error correction, such as by using forward error correction (FEC), a technique employed by a media receiver/decoder to correct transmission errors over the communication channel. These metrics also fail to is accurately capture the error concealment strategies of decoders. As a result, network performance metrics often do not correlate well with measures of user experience quality since many of the recorded losses are corrected prior to ever reaching the user. Furthermore, bursty packet losses tend to introduce different amounts of distortion than random isolated losses, and these metrics often do not take into account packet loss patterns.

In addition, many systems today and in the future include encryption or integrity checks of the transmitted data. Sometimes these are done on a per-packet basis, and sometimes on a segment of data that covers multiple packets. As a results the loss of one packet can lead to having multiple additional packets which are received but are either not decryptable or do not pass integrity checks, and therefore are equivalent to lost packets (i.e., data that arrives but can not be decrypted or fails the integrity check is not usable). This is another disadvantage of conventional network performance metrics which do not account for the required proper decryption and integrity checks, and therefore will not realize that those received packets are equivalent to lost packets.

Content-Independent Evaluation of Streaming Media Based on Packet Transmission Performance The techniques herein introduce a lightweight, content-independent evaluation method for streaming media and other network communications that may be used to improve system processing. In some aspects, the proposed method calculates a quality degradation score based on observed packet loss traces (e.g., after application of FEC decoding techniques), and distinguishes between the impact of different loss patterns (e.g., contiguous vs. dispersed losses). The method can be used as a tool for both online (e.g., embedded in mobile devices or hardware endpoints) and offline cloud-based quality monitoring.

Illustratively, the techniques described herein may be performed by hardware, software, and/or firmware, such as in accordance with the media streaming process 248, which may contain computer executable instructions executed by the processor 220 (or independent processor of interfaces 210) to perform functions relating to the techniques is described herein.

Specifically, according to one or more embodiments of the disclosure, a device in a network assigns packets from a communication transmitted via the network to time windows over a period of time. The device determines a transmission performance metric for each of the packets in a particular time window and calculates, for each of the time windows, local disturbance scores, which are based on the transmission performance metrics for the packet in the time windows. A particular local disturbance score for a particular time window maps the transmission performance metrics for the packets in the time window to a perceived quality metric. The device determines a distortion score for the communication by aggregating the local disturbance scores for the time windows over the period of time.

Operationally, FIGS. 3A-3D illustrate an overview of a specific end-to-end media streaming process 300 of the present disclosure. As generally shown, media source 106 may execute a source encoder 302 and/or an FEC encoder 304 as part of its media streaming process 248, to prepare source media data 314 for transmission to client 102 via network 104. Likewise, client 102 may execute an FEC decoder 308 and/or source decoder 310 as part of its media streaming process 248, to convert the received media stream packets from media source device 106 into signals for one or more user interface devices of client 102 (e.g., a speaker, a display, etc.).

As would be appreciated, while an FEC encoding/decoding mechanism is shown in FIGS. 3A-3D to illustrate the techniques herein, this is but one potential use for the techniques herein. More specifically, the techniques herein can be used to assess any application-specific local disturbances, regardless of the application layer error control mechanism used, whether it be FEC, retransmissions, encryption and integrity checks, etc.

Figure 3A:
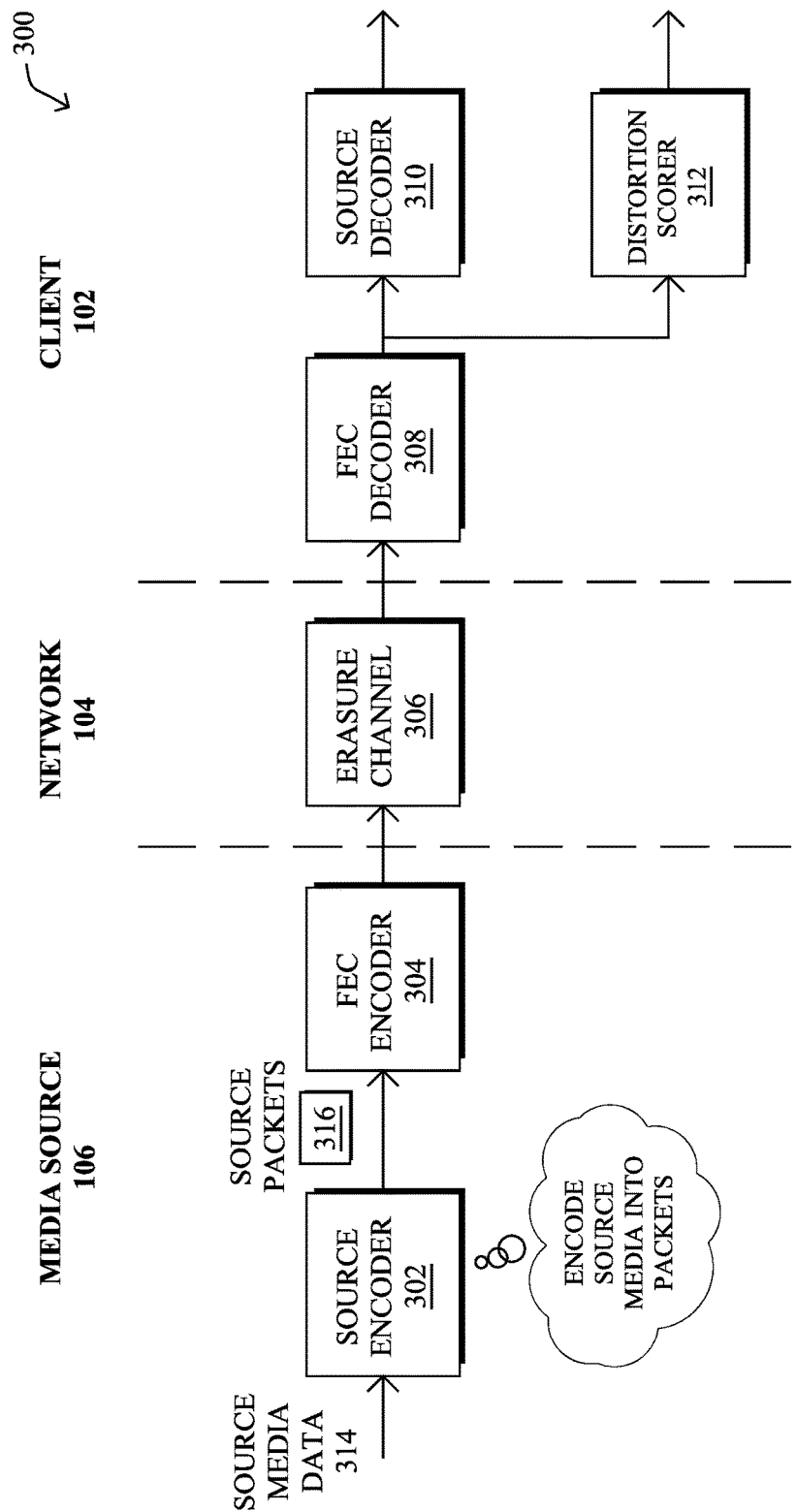
FIG. 3A-3D illustrate an example view of the communication network with respect to streaming media.

As shown in FIG. 3A, media source device 106 may execute a source encoder 302 (e.g., a subroutine of media streaming process 248) that encodes source media data 314 into a sequence of source packets 316. As would be appreciated, source media data 314 may include any number of different media streams. For example, source media data 314 is may include audio data, video data, a combination of audio and video, multiples thereof, or the like.

Figure 3B:
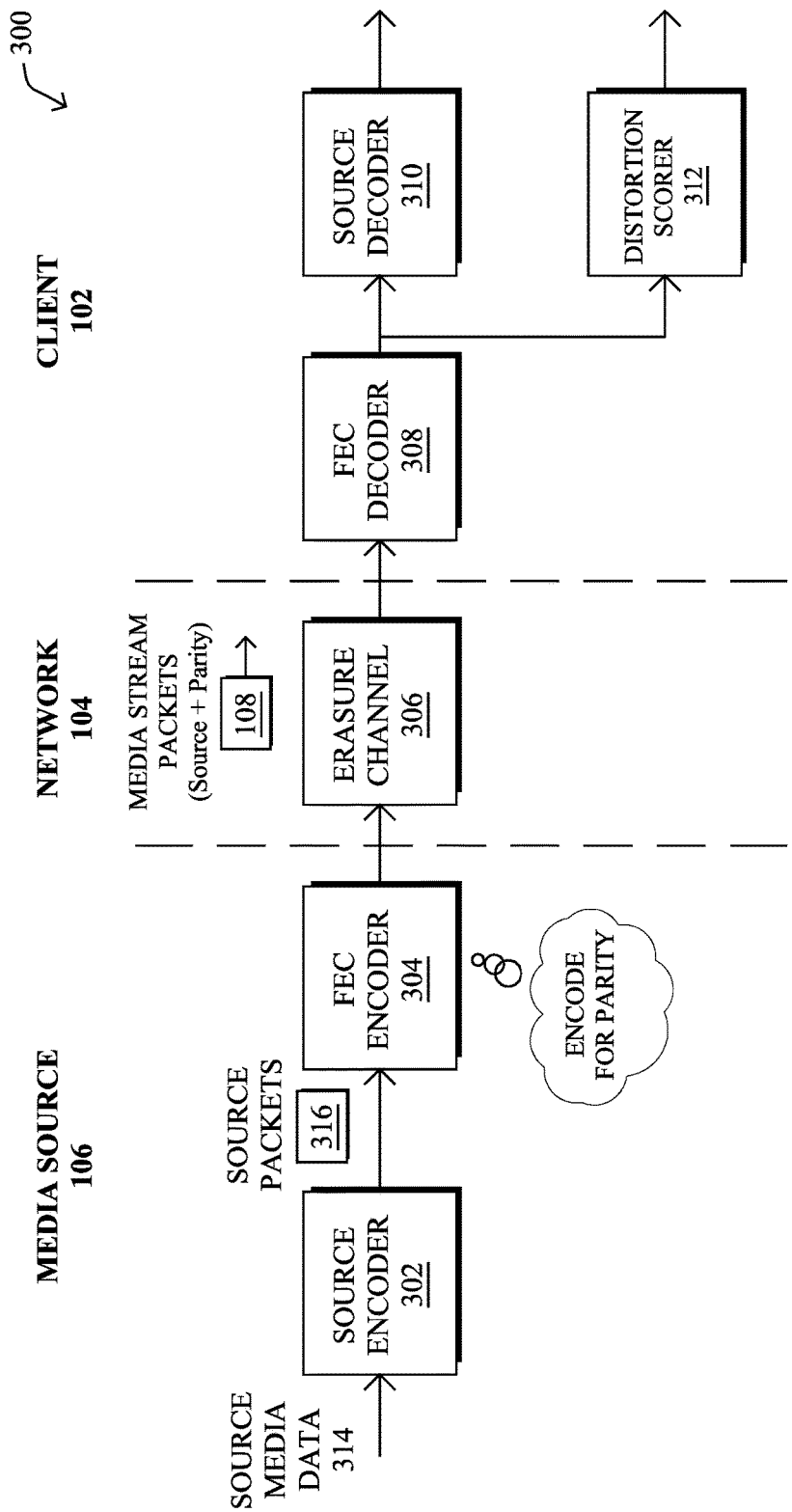

In FIG. 3B, media source 106 may also employ an FEC encoder 304 to encode source packets 316 for parity before transmitting to client 102 as part of media stream packets 108. Generally, FEC refers to a class of techniques that seek to correct for errors that may occur over the transmission channel, without requiring full redundant transmission of the packets. For example, packet losses may be unavoidable in network 104 over an erasure channel 306, which derives its name from the fact that the channel "erases" packets during transmission.

In some cases, FEC encoder 304 may use erasure encoding, to protect media stream packets 108 from transmission errors. This form of encoding has the property that only a subset of the full set of transmitted packets is needed to recover the original message at the receiver. For example, FEC encoder 304 may add a parity check to source packets 316 and apply a transformation function to source packets 316 prior to transmission. In turn, when FEC decoder 308 of client 102 receives media stream packets 108, including the parity information, FEC decoder 308 can then perform a parity check on media stream packets 108 by computing a checksum, to determine whether any of packets 108 were lost during transmission. If a packet of media stream packets 108 was lost, FEC decoder 308 may still be able to recover the lost packet based on the other received packets 108, thereby forming a stream of recovered source packets 320 for processing by source decoder 310.

Figure 3C:
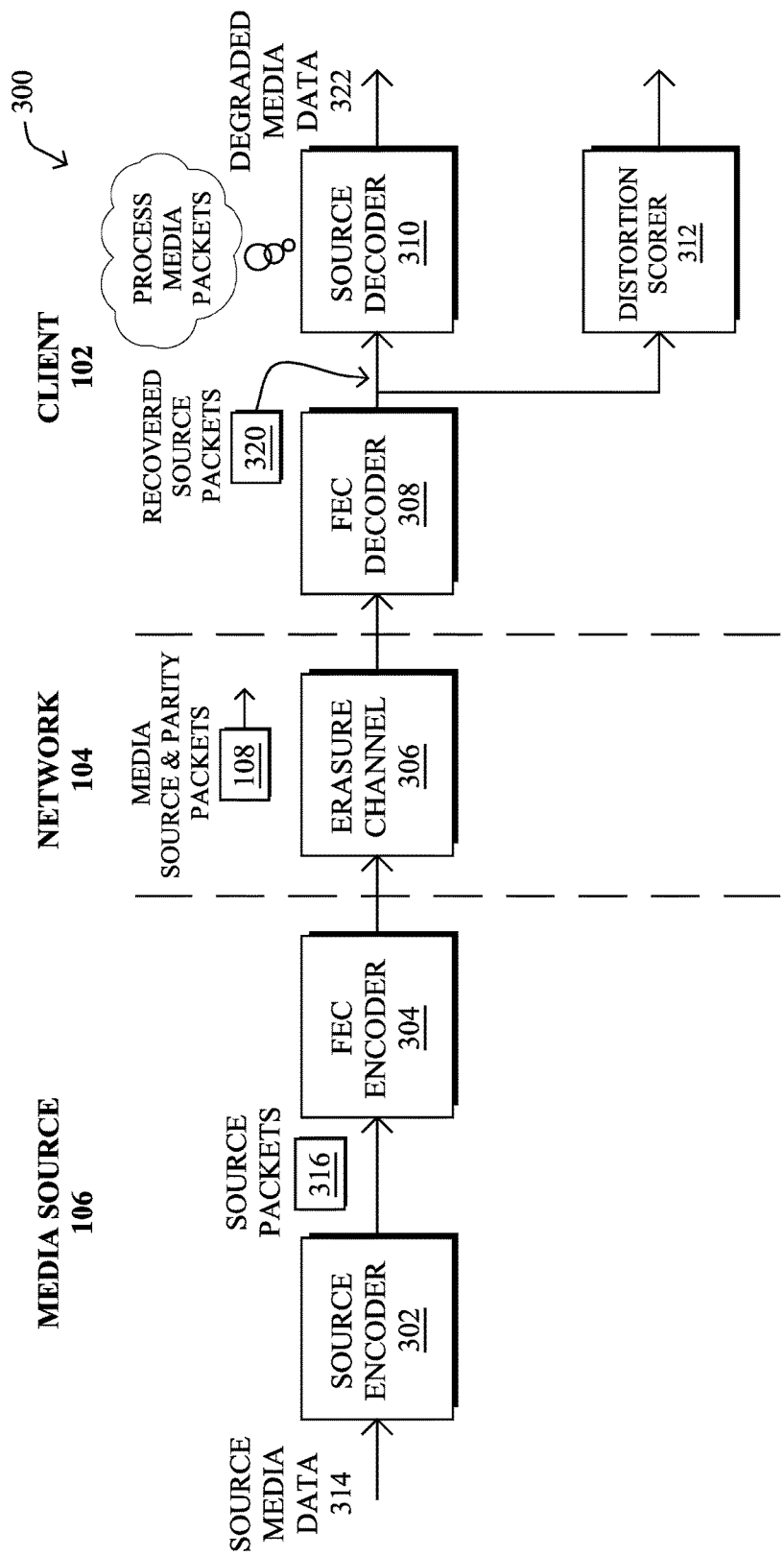

As shown in FIG. 3C, source decoder 310 may process recovered source packets 320 and provide the recovered media data 322 for output to the user interface(s) of client 102 (e.g., a speaker, display, etc.). As would be appreciated, media data 322 may be at least somewhat degraded from that of source media data 314. In particular, while the FEC mechanism may be able to correct for some lost packets, some degradation may still occur, particularly in the case of bursty losses in erasure channel 306. Depending on the degree of degradation, this may also affect the perceived quality of media data 322 presented to the user of client 102.

If the transmitted media data is encrypted or includes integrity checks, the source decoder may also confirm that proper decryption is performed and/or that integrity checks are correctly passed. If the decryption is not correctly performed or if the integrity check fails, then the associated data can be viewed as having undergone packet loss for the purpose of assessing the perceived quality of the streaming media. For example, if one transmitted packet is lost, depending on the design of the encryption and/or integrity checks of the system, one or more received packets may be unencryptable or fail integrity checks—and therefore those received packets cannot be used for decoding and the perceived quality is equivalent to if those packets were lost. In the following discussion we assume for simplicity that the residual packet losses after FEC correction also accounts for the effects of unencrypted or failed integrity checks.

Figure 3D:
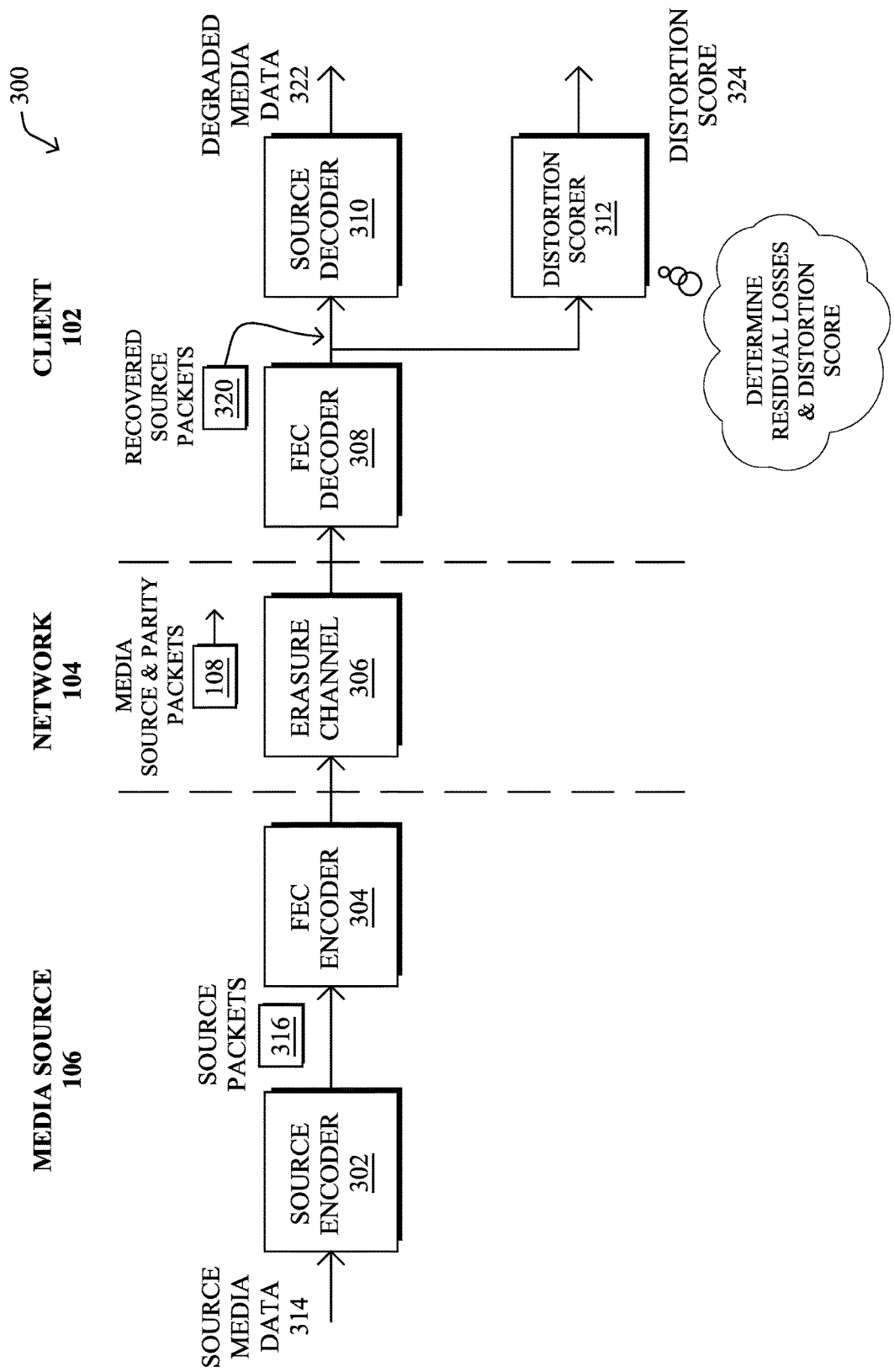

In various embodiments of the present techniques, client 102 may assess the severity/significance of the degradation and perceived quality of the streaming media based on the trace of residual packet losses after FEC correction by FEC decoder 308. This is in direct contrast to approaches that may instead assess only the losses in channel 306 prior to correction or on the resulting degraded media data 322, itself. In particular, as shown in FIG. 3D, at the client device 102, distortion scorer 312 may analyze recovered source packets 320 from FEC decoder 308 to compute a distortion score 324. In some embodiments, distortion score 324 may be an approximation of the perceived quality of the media from the perspective of the user. This also allows distortion score 324 to be content independent, as it is not based on the actual media data 322 presented to the user of client 102. Rather, distortion scorer 312 may use a loss-pattern-aware distortion evaluation technique to compute distortion score 324.

While FIGS. 3A-3D illustrate client 102 executing distortion scorer 312, further embodiments provide for another device in the network executing distortion scorer 312, instead. For example, client 102 may send packet-level transmission reports to the other device (e.g., a cloud-based device, a central server in the network, etc.), which then assesses the reports using distortion scorer 312. In further embodiments, such a quality monitoring device may also receive the reports via in-network monitoring processes.

Said differently, the techniques described in the present disclosure apply to the trace of residual packet losses after FEC decoding, rather than raw channel losses provided to the FEC decoder. It has been found that for many types of media content, including audio, it is sufficient to consider a distortion score for a window of loss patterns, and the resulting scores can be pooled or aggregated across multiple windows. Distortion metrics relating to each of the possible loss patterns in a window can be pre-computed and used to determine a measure of the quality of the streamed media at run time. In one specific embodiment, distortion scorer 312 may use sliding-window-based assignments to recovered source packets 320 so that the final distortion score 324 is time-shift independent. In other embodiments, distortion scorer 312 may vary the stride length between adjacent inspection windows. For example, distortion scorer 312 may only consider loss patterns that start at an even packet position (i.e., stride length=2). The choice of stride length, which may be controlled by one or more parameter settings of distortion scorer 312, determines the tradeoff between computation and accuracy of the final score 324. Time windows can also be non-overlapping, in some embodiments. However, while less computationally intensive, non-overlapping windows may also be less accurate. Notably, using a sliding window compared to non-overlapping windows amounts to averaging over more "phases" or "shifts," and may lead to better results.

In further embodiments, distortion scorer 312 may be configured to assess the input of FEC decoder 308 (e.g., data from packets 108), in addition to, or in lieu of, the input to source decoder 310. Notably, by doing so, distortion scorer 312 may benchmark the actual network losses, delays, etc., instead of, or in addition to, the residual network losses, delays, etc.

Figure 4A:
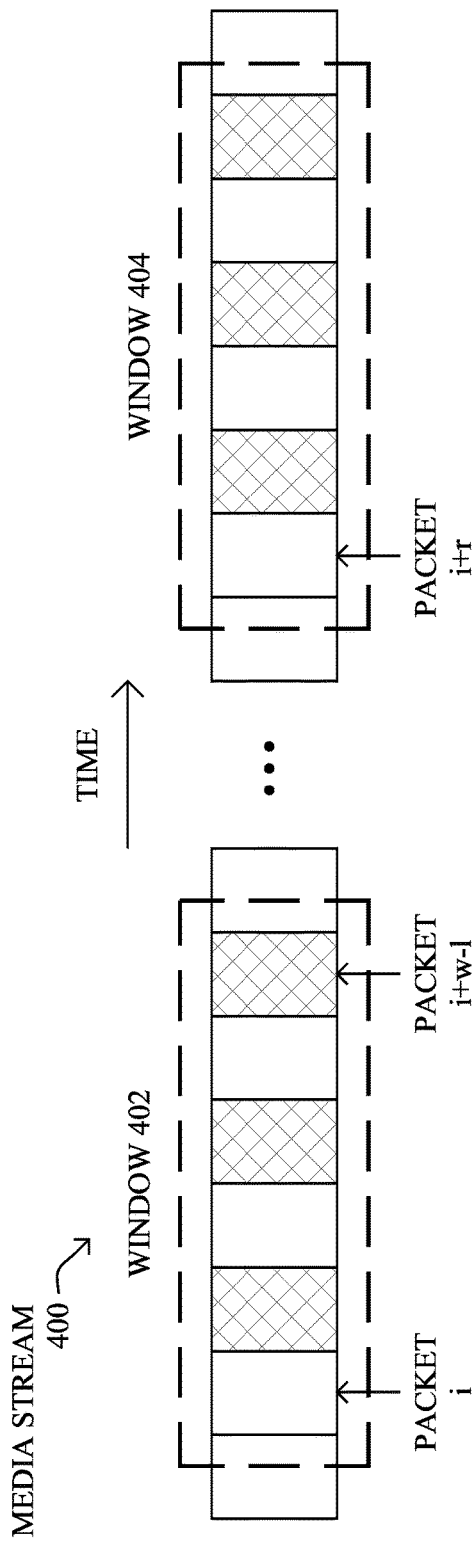
FIGS. 4A-4C illustrate examples of determining transmission performance metrics for media stream packets.
Figure 4B:
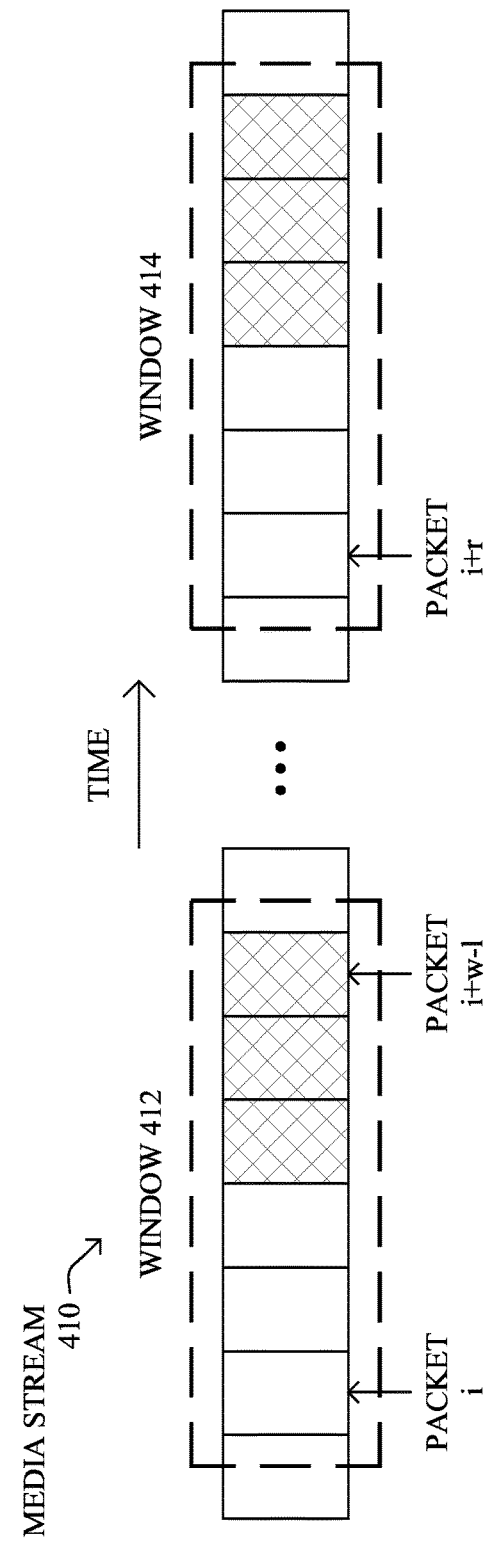
Figure 4C:
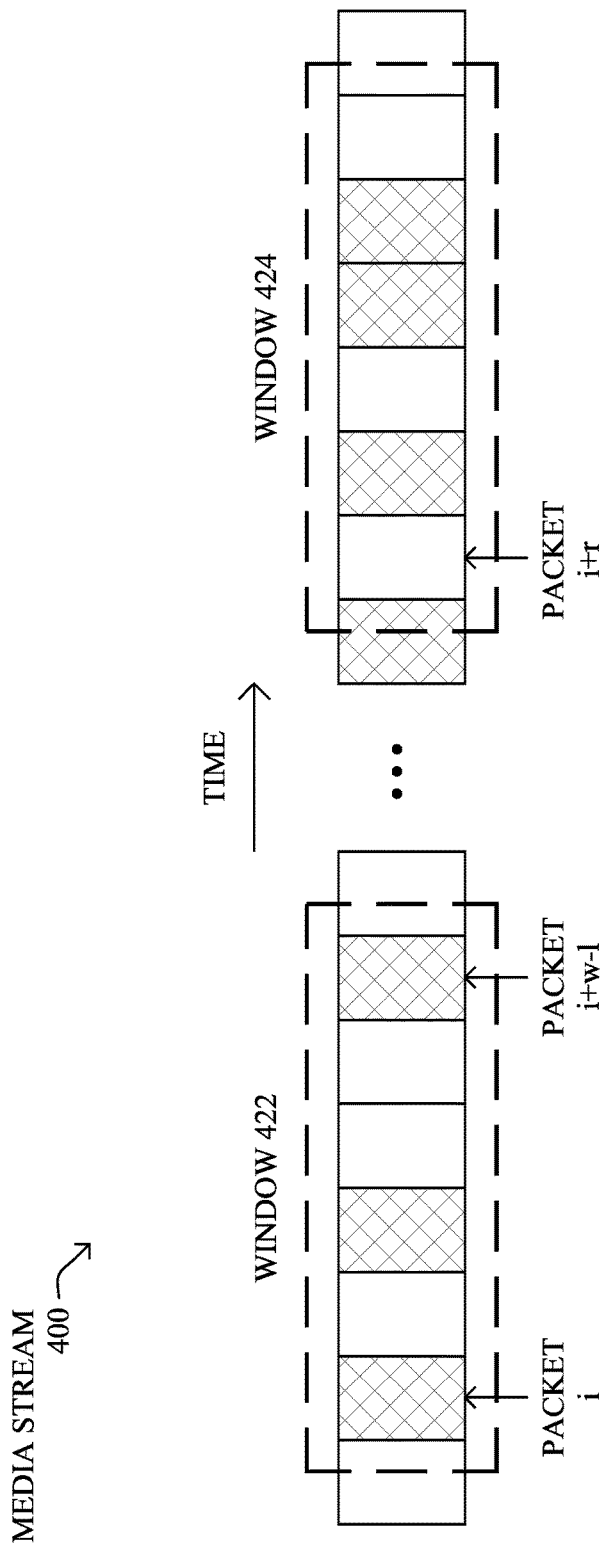

A specific embodiment of this technique is shown in FIGS. 4A-4C. As shown, media stream 400 comprises various media packets. Packets from the media stream have been assigned by distortion scorer 312 to a sliding time window having a window size w.

As a specific example, FIG. 4A shows packets i to (i+w−1) of media stream 400 assigned to window 402 and packets from an adjacent loss episode, at a different time and spaced apart by r packets, assigned to window 404. In this specific example, w=6 and r=10. While it would be expected that a larger input window, w, would result in is greater assessment flexibility, the number of possible patterns grows exponentially as $2^w$, increasing the complexity of the disturbance determination.

Distortion scorer 312 may determine a transmission performance metric for each of the packets in the assigned sliding time window, such as whether any given packet was not recoverable by FEC decoder 308. As shown in FIGS. 4A-4C, a dark square indicates that the packet is, in some way, unavailable for media decoding. In this way, a local loss pattern emerges, which can be represented by a binary sequence $v_i=[z_i, \ldots, z_{i+w-1}]$, wherein $z_i$ is a residual loss and $z_i=1$ is an unavailable packet. While the techniques are described in FIGS. 4A-4C with respect to packet losses/erasures, variations of the techniques may instead evaluate other performance metrics such as delays, jitter, or the like.

Each of the examples in FIGS. 4A-4C may exhibit the same overall amount of packet loss, but with different loss patterns. For example, as shown in FIG. 4A, the local loss pattern for media packets assigned to windows 402 and 404 is repetitive and may be represented by v=[0,1,0,1,0,1]. Similarly, for media stream 410 shown in FIG. 4B, the local repetitive loss pattern for media packets assigned to windows 412 and 414 is v=[0,0,0,1,1,1], which demonstrates a larger burst loss length than that in the example of FIG. 4A. Finally, FIG. 4C illustrates a media stream 420 having a random loss pattern and assigned to sliding time windows 422 and 424, with the loss patterns represented as v=[1,0,1,0,0,1] and v=[0,1,0,1,1,0].

In some embodiments, distortion scorer 312 may calculate a local disturbance score based on the transmission performance metrics for the packets in the sliding time windows. In one specific embodiment, distortion scorer 312 may calculate a local disturbance score, $d_i$ for each local window, $v_i=[z_i, \ldots z_{i+w-1}]$ based on their performance metrics, according to the following:

$$d_i = f(v_i), i=1, \ldots, n$$

Notably, the local disturbance score for any given time window may be a function of the loss pattern, or the like, of the recovered packets. Generally, a particular local disturbance score for a particular sliding time window maps the transmission is performance metrics from the packets in the time window to a perceived quality metric, including, for example, perceptual evaluation of speech quality (PESQ), mean opinion score (MOS), etc. For example, the loss pattern illustrated in FIG. 4A may be less noticeable to a user, whereas the loss pattern illustrated in FIG. 4B may be more noticeable. In other words, even though each of the loss patterns in FIGS. 4A-4C have the same overall loss rate, the loss pattern variations may affect the perceived quality of the media presented to the user.

Distortion scorer 312 may calculate the local disturbance score in a variety of different ways. For example, in one embodiment, distortion scorer 312 may calculate the local disturbance score for a given time window by retrieving a perceived quality metric from a lookup table for a particular time window based on the transmission performance metrics of the packets in the time window. The lookup table may contain values derived based on empirical data. For example, the table can be populated by evaluating sample sets of media data, from which various perceived quality metrics can be determined. As a specific example, for an audio stream, given each loss pattern, v, a set of loss traces can be generated by varying the starting position of the first episode. PESQ MOS scores can then be collected for a set of representative speech samples that are subjected to these loss traces, and a corresponding local disturbance score can then be calculated, either by distortion scorer 312 or another process.

In one specific embodiment, the local disturbance score for a given loss pattern, v, corresponds to the average of PESQ differential MOS (DMOS) scores between audio samples subject to repeating episodes of the that loss pattern, v, and their loss-free counterpart. In this way, the local disturbance scores can be determined (i.e., "trained") offline from a representative set of media contents and their quality degradation scores (measured using one of existing objective quality metrics), in response to different packet loss patterns. For example, given each loss pattern, v, a set of loss traces can be generated by varying the starting position of the first episode (indexed by j∈ J). In turn, the PESQ MOS scores can be collected for a set of representative speech samples (indexed by i∈S) that are subject to these loss traces. The following can then be used to determine the local disturbance score:

$$f(v) = \frac{\sqrt{r/w}}{|S||\mathcal{J}|} \sum_{i \in S} \sum_{i \in \mathcal{J}} DMOS_{i,j}^v.$$

where $DMOS_{i,j}^v$ denotes the DMOS score between the loss-free encoder output and the loss-impaired version with repetitive pattern v for the $i^{th}$ audio sample and $j^{th}$ starting position. The scaling factor $(r/w)^{1/2}$ compensates for the loss-free intervals between adjacent loss episodes. Although the above equation depends on PESQ scores from a set of representative content, it only needs to be computed once to tabulate f(v) for all possible loss patterns. In turn, distortion scorer 312 may simply perform a table lookup during runtime for the value of $d_i=f(v_i)$ given $v_i$ in a content-independent manner.

Distortion scorer 312 may also determine a final score 324 for the media stream/communication by aggregating the local disturbance scores for the time windows over the period of time. For example, in some embodiments, the disturbance score can be a linear summation of each local disturbance score. In alternative embodiments, a non-linear weighting function can be used to weight the local disturbance scores. In a specific embodiment, the disturbance score can be aggregated as follows:

$$D = (\frac{1}{n}\sum_{i=1}^{n} (d_\varepsilon^p))^{1/p}$$

When p=1, the above equation reduces the aggregation to linear averaging. When p=2, this equation corresponds to calculating the root of the mean-squared value of all local disturbance scores. Other values of p are possible as alternative embodiments. Note also that the above techniques can be used to compute combined score for mixtures of applications (e.g., by applying a simple weighted average of scores, etc.).

Simulation-based evaluations were carried out for one specific embodiment of the present disclosure. For example, the quality of received audio subjected to residual packet losses from various combinations of FEC codes and erasure channels were assessed. It was found that values obtained from the present loss-pattern-aware distortion techniques closely tracked an ensemble average of PESQ DMOS scores of a collection of audio samples. The correlation coefficient ranged from 0.90 to 0.97.

Figure 5:
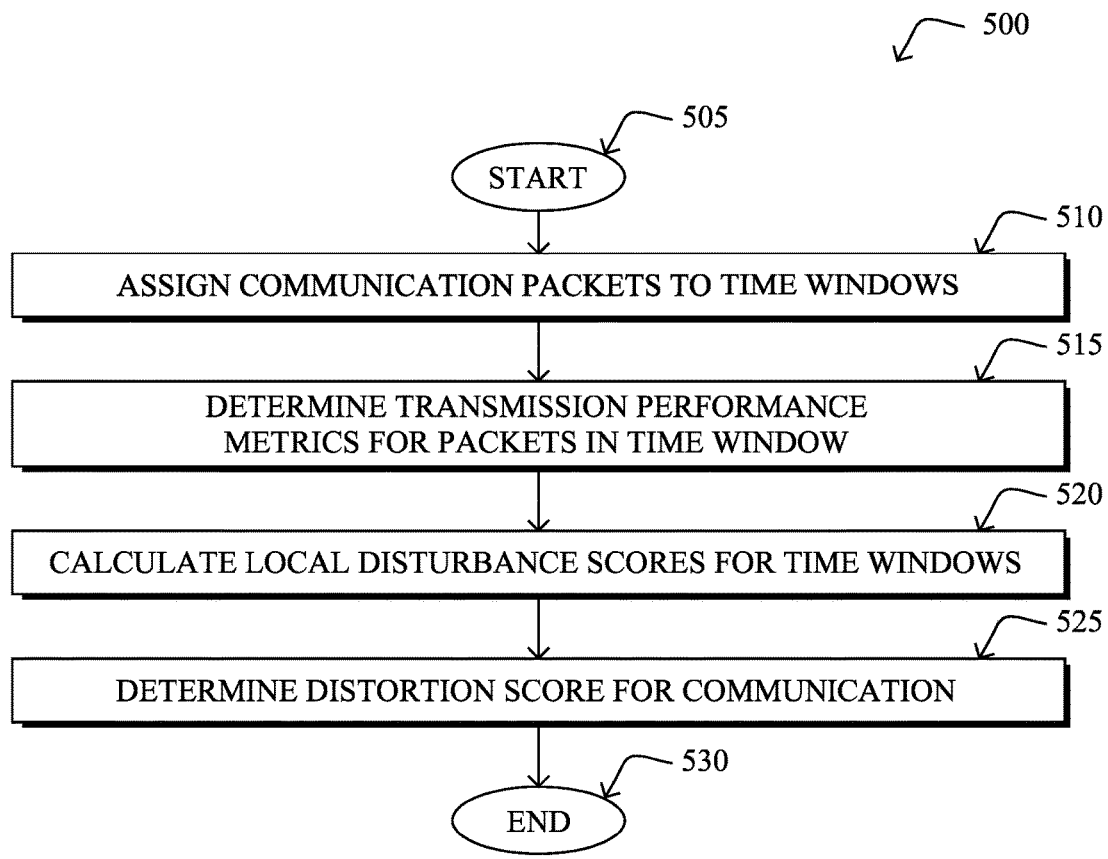
FIG. 5 illustrates an example simplified procedure for determining a distortion score for a communication.

FIG. 5 illustrates an example simplified procedure for determining a distortion score in accordance with one or more embodiments of the techniques described herein. For example, a non-generic, specifically configured device (e.g., device 200) may perform procedure 500 by executing stored instructions. The procedure 500 may start at step 505 and continues to step 510, where, as described in greater detail above, the device may assign packets from a communication (e.g., a media stream, etc.) transmitted via a network to time windows over a period of time. For example, in one embodiment, sliding-window-based assignments are made so that the final score is time-shift independent. In other embodiments, the stride length between adjacent inspection windows is varied.

At step 515, as described in more detail above, the device determines a transmission performance metric for each of the packets in a particular time window. The metrics can be, for example, packet drops/losses, packet delays, jitter, etc. For example, in one embodiment, the transmission performance metrics indicate residual packet losses after forward error correction (FEC) processing of the media stream. In another embodiment, the transmission performance metrics indicate residual packet delays after FEC processing of the media stream. The device may also dynamically select which performance metric it determines (e.g., based on the application) or based on a configurable parameter.

At step 520, the device calculates local disturbance scores for each of the time windows. As described in more detail above, the local disturbance scores are based on the transmission performance metrics for the packets in the time windows. A particular local disturbance score for a particular time window maps the transmission performance metrics for the packets in the time window to a perceived quality metric, such as PESQ score or MOS. In one embodiment, the local disturbance scores are calculated by the device by retrieving a perceived quality metric from a lookup table for a particular time window based on the transmission performance metrics of the packets in the time window. The values in such a lookup table may be trained (e.g., either offline or online) using multiple media samples subject to various repetitions of the same loss patterns.

At step 525, the device may determine a distortion score for the communication by aggregating the local disturbance scores for the time windows over the time period. For example, as described in more detail above, aggregation may be either a linear or non-linear weighting of the local disturbance scores. In some embodiments, the device may further adjust transmission of the media stream based on the determined distortion score. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Thus, the media streaming techniques of the present disclosure provide for a content-independent distortion metric for evaluating streaming media systems after traffic error correction, which correlates well with content-dependent perception-based scores, all without being swayed by media content variations. This significantly simplifies characterization and quantification of the impact of disturbances in transmission on application performance, leading to methods and techniques to remove sources of streaming errors, such as the development of new corrective coding methods which focus on the particular sources of residual losses. In some embodiments, therefore, the method further comprises adjusting or otherwise modifying media streaming transmission based on the distortion score. In this way, effects of streaming losses may be significantly reduced or eliminated. For example, the method may further comprise applying a revised forward error correction (FEC) code to a media stream having both dispersed residual losses and burst losses, wherein the revised forward error correction code favors dispersed residual losses over burst losses.

While there have been shown and described illustrative embodiments that provide for media streaming, it is to be understood that various other adaptations and modifications may be made within the spirit and scope of the embodiments herein. For example, the embodiments may, in fact, be used with a variety of types of shared-media networks and/or protocols (e.g., wireless) and sources of streamed media. Also, various other error correction/control methods, alternatively or in addition to the FEC coding and decoding, may also be used.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
assigning, by a device in a network, packets of a communication transmitted via the network to a plurality of time windows over a period of time;
determining, by the device, a transmission performance metric for each of the packets in a particular time window;
calculating, by the device and for each of the time windows, local disturbance scores based on the transmission performance metrics for the packets in the time windows, wherein a particular local disturbance score for a particular time window maps the transmission performance metrics for the packets in the time window to a perceived quality metric;
determining, by the device, a distortion score for the communication by aggregating the local disturbance scores for the plurality of time windows over the period of time, wherein the distortion score is content-independent and is determined after traffic error correction; and
adjusting, by the device, the transmission of the communication based on the distortion score for the communication.

2. The method as in claim 1, wherein the transmission performance metrics indicate residual packet losses or delays.

3. The method as in claim 1, wherein the plurality of time windows are sliding or overlapping windows.

4. The method as in claim 1, wherein determining the distortion score for the communication comprises:
using, by the device, a non-linear weighting function to weight the local disturbance scores.

5. The method as in claim 1, wherein the perceived quality metric comprises a perceptual evaluation of speech quality (PESQ) score or a mean opinion score (MOS).

6. The method as in claim 1, wherein calculating the local disturbance scores comprises:
retrieving, by the device, a perceived quality metric from a lookup table for a particular time window based on the transmission performance metrics of the packets in the time window.

7. The method as in claim 6, further comprising:
populating, by the device, the lookup table by evaluating one or more sample sets of media data to determine perceived quality metrics for the one or more sample sets of media data.

8. An apparatus, comprising:
one or more network interfaces to communicate with a network;
a processor coupled to the network interfaces and configured to execute one or more processes; and
a memory configured to store a process executable by the processor, the process when executed operable to:
assign packets from a communication transmitted via the network to a plurality of time windows over a period of time;
determine a transmission performance metric for each of the packets in a particular time window;
calculate, for each of the time windows, local disturbance scores based on the transmission performance metrics for the packets in the time windows, wherein a particular local disturbance score for a particular time window maps the transmission performance metrics for the packets in the time window to a perceived quality metric;
determine a distortion score for the communication by aggregating the local disturbance scores for the time windows over the period of time, wherein the distortion score is content-independent and is determined after traffic error correction; and
adjust the transmission of the communication based on the distortion score for the communication.

9. The apparatus as in claim 8, wherein the transmission performance metrics indicate residual packet losses or delays.

10. The apparatus as in claim 8, wherein the plurality of time windows are overlapping.

11. The apparatus as in claim 8, wherein the apparatus determines the distortion score for the communication by using non-linear weighting function to weight the local disturbance scores.

12. The apparatus as in claim 8, wherein the perceived quality metric comprises a perceptual evaluation of speech quality (PESQ) score or a mean opinion score (MOS).

13. The apparatus as in claim 8, wherein the apparatus determines the local disturbance scores by:
retrieving a perceived quality metric from a lookup table for a particular time window based on the transmission performance metrics of the packets in the time window.

14. The apparatus as in claim 13, wherein the process when executed is further operable to:
populate the lookup table by evaluating one or more sample sets of media data to determine perceived quality metrics for the one or more sample sets of media data.

15. A tangible, non-transitory, computer-readable media having software encoded thereon, the software when executed by a device in a network operable to:
assign, by the device, packets from a communication transmitted via the network to a plurality of time windows over a period of time;
determine, by the device, a transmission performance metric for each of the packets in a particular sliding time window;
calculate, by the device and for each of the sliding time windows, local disturbance scores based on the transmission performance metrics for the packets in the time windows, wherein a particular local disturbance score for a particular time window maps the transmission performance metrics for the packets in the time window to a perceived quality metric;
determine, by the device, a distortion score for the communication by aggregating the local disturbance scores for the time windows over the period of time, wherein the distortion score is content-independent and is determined after traffic error correction; and
adjust the transmission of the communication based on the distortion score for the communication.

16. The computer-readable media as in claim 15, wherein the plurality of time windows are non-overlapping.

17. The computer-readable media as in claim 15, wherein the software when executed is further operable to:
retrieve a perceived quality metric from a lookup table for a particular time window based on the transmission performance metrics of the packets in the time window; and populate the lookup table by evaluating one or more sample sets of content from a particular application to determine perceived quality metrics for the one or more sample sets of the content.

18. The computer-readable media as in claim 15, wherein the software when executed is further operable to:
   determine a combined distortion score for multiple applications.

* * * * *

UNITED STATES PATENT AND TRADEMARK OFFICE
CERTIFICATE OF CORRECTION

| | | |
|---|---|---|
| PATENT NO. | : 10,218,765 B1 | Page 1 of 1 |
| APPLICATION NO. | : 15/271320 | |
| DATED | : February 26, 2019 | |
| INVENTOR(S) | : Xiaoqing Zhu et al. | |

It is certified that error appears in the above-identified patent and that said Letters Patent is hereby corrected as shown below:

In the Specification

Column 2, Line 35, please amend as shown:
wireless links between client device 102 and media source Column 3, Line 8, please amend as shown:
connected by a system bus 250, as well as a power supply Column 3, Line 50, please amend as shown:
example, packet losses due to weak signal strength in a Column 4, Line 27, please amend as shown:
accurately capture the error concealment strategies of Column 4, Line 66, please amend as shown:
210) to perform functions relating to the techniques Column 5, Line 41, please amend as shown:
may include audio data, video data, a combination of Column 7, Line 34, please amend as shown:
that a larger input window, w, would result in greater Column 8, Line 10, please amend as shown:
transmission performance metrics from the packets in the Signed and Sealed this
Seventh Day of January, 2020

Andrei Iancu
*Director of the United States Patent and Trademark Office*